UNITED STATES PATENT OFFICE.

ALFRED W. OLVER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY CERAMIC ARTICLE AND METHOD OF MAKING THE SAME.

1,273,529. Specification of Letters Patent. Patented July 23, 1918.

No Drawing. Application filed February 16, 1918. Serial No. 217,475.

*To all whom it may concern:*

Be it known that I, ALFRED W. OLVER, a citizen of the United States, residing at Niagara Falls, in the county of Niagara and State of New York, have invented a new and useful Improvement in Refractory Ceramic Articles and Methods of Making the Same, of which the following is a full, clear, and exact description.

This invention relates to an improvement in refractory ceramic articles and in the method of making the same, and more particularly to articles in which plastic clay is used as one of the component materials. One object of the invention is to increase the plasticity of the mixture and thereby aid in the molding operation, especially where the mixture has a small proportion of clay and a large proportion of inert refractory material. Such mixtures are difficult to get into a plastic condition to flow satisfactorily in the molding operation and give a solid homogeneous structure.

I have found that the desired results may be accomplished by adding tar to the mixture of clay and refractory material, the tar acting in the nature of a lubricant and also having some action in holding the clay in suspension, thus making the molding operation easier. Its use also makes a strong article when dried out ready for subsequent burning and one which is superior in durability, texture, and other respects hereinafter mentioned.

I will illustrate the application of the invention by describing it as applied to the manufacture of carborundum rods, such as are used for electric resistance or heating elements. I make a mixture of the following ingredients:—

Powdered carborundum ___ 70 parts
  Albany slip clay _____ 30 parts
  Tar _____ 5 parts
  Water _____ 5 parts These ingredients are thoroughly mixed in a mixing machine and the mixture tamped into molds of proper dimensions to form round rods 8" long ¾" diameter. The mold is split longitudinally and after the mold is filled with the mixture the two halves are parted and the rod removed. I find that the tar greatly assists in the molding and gives a close homogeneous texture in the rod.

For making rods in a core machine, or by the extrusion process, I use the same mixture mentioned above except that the amount of water is increased to 10 parts. These ingredients are preferably mixed in a pug mill until the full plasticity of the clay is developed. The mixture is then molded into the form of rods by charging it into an extruding press such as is commonly used in the manufacture of carbon electrodes. A mass of the mixture is placed in the cylinder of the press and the ram, actuated by hydraulic pressure, forces it to flow out through a die which tapers down to the final size of the rod. For the manufacture of rods, say one inch in diameter and ten inches in length, the rod is extruded to the proper diameter in long lengths and then when still in the wet state, is cut to the proper lengths. When using the same proportions of ingredients, it is important to obtain uniform structure in the rod so as to give uniform electrical resistances. Without the addition of the tar, the clay does not have sufficient plasticity or binding power to hold the mixture together and cause it to flow properly through the die; and small circumferential cracks are formed on the surface. The articles have a rough picked-up surface, and are of weak structure throughout. With the tar added to the mix, the plasticity is greatly increased and the rods come out very smooth and of extremely dense and uniform structure. Varying percentages of tar may be used down to 1 or 2 per cent. I find that less water is required when larger amounts of tar are used. When the mixtures contain in addition varying percentages of graphite, as may be desirable in order to obtain varying electrical conductivities, I find the tar gives equally good results.

In the molding of pyrometer protection tubes the same method may be followed and the same extrusive apparatus employed as for resistance rods. In the molding of muffles and crucibles in which a mixture of carborundum grains, powdered graphite and from ten to twenty per cent. of plastic clay is used, I find the addition of the tar is of great assistance in carrying out the usual molding operations and gives a body which is greatly superior to bodies made without its use in strength, durability, texture, freedom from cracks and flaws, and in the ability to stand sudden changes of temperature and resistance to corrosion and high temperature conditions. The method can also be applied in the manufacture of carborundum chemical ware and various other refractory vessels and refractory articles. Instead of carborundum I may use other refractory materials, such as fused crystalline alumina, fused or calcined magnesia, zirconia, and bauxite.

I have not been able to determine fully the action of the tar but believe that it not only lubricates the particles of the mixture and enables them to flow more easily in the molding operations but that it also assists in placing more of the clay in a state of mechanical or colloidal suspension. The addition of water is of importance, since the action of tar when used in connection with water is entirely different from its action when used without water, and the plasticity of the clay is developed to a much greater extent.

I claim:

1. The method of making refractory ceramic articles which consists in making a mixture of clay, refractory material, water, and tar, mixing the same thoroughly until high plasticity is developed, and then molding the article into the desired form.

2. The method of making carborundum ceramic articles which consists in making a mixture containing clay, carborundum, and tar, mixing the same thoroughly until high plasticity is developed, and then molding the article into the desired form.

3. The method of making carborundum ceramic articles which consists in making a mixture containing carborundum, graphite, clay and tar, mixing the same thoroughly until high plasticity is developed, and then molding the article into the desired form.

4. The herein described composition consisting of a highly plastic mixture containing plastic clay, refractory material, water, and tar.

5. The herein described composition consisting of a highly plastic mixture containing plastic clay, carborundum, and tar.

6. The herein described composition consisting of a highly plastic mixture containing plastic clay, carborundum, graphite and tar.

In testimony whereof, I have hereunto set my hand.

ALFRED W. OLVER.